(12) United States Patent
Strandjord et al.

(10) Patent No.: US 7,586,619 B2
(45) Date of Patent: Sep. 8, 2009

(54) SPECTRAL BALANCING SYSTEM AND METHOD FOR REDUCING NOISE IN FIBER OPTIC GYROSCOPES

(75) Inventors: Lee K. Strandjord, Tonka Bay, MN (US); Scott A. Anson, Iowa City, IA (US)

(73) Assignee: Honeywell International, Inc., Morristown, NJ (US)

( * ) Notice: Subject to any disclaimer, the term of this patent is extended or adjusted under 35 U.S.C. 154(b) by 106 days.

(21) Appl. No.: 11/643,435

(22) Filed: Dec. 21, 2006

(65) Prior Publication Data

US 2008/0297805 A1 Dec. 4, 2008

(51) Int. Cl.
*G01C 19/72* (2006.01)
(52) U.S. Cl. .................................... 356/460
(58) Field of Classification Search ................ 356/460, 356/465, 470, 464; 385/12
See application file for complete search history.

(56) References Cited

U.S. PATENT DOCUMENTS

| | | | |
|---|---|---|---|
| 4,842,358 A * | 6/1989 | Hall ............................ | 385/12 |
| 5,331,404 A | 7/1994 | Moeller et al. | |
| 5,381,230 A * | 1/1995 | Blake et al. ................ | 356/460 |
| 5,469,257 A * | 11/1995 | Blake et al. ................ | 356/464 |
| 5,655,035 A | 8/1997 | Burmenko | |
| 6,304,921 B1 | 10/2001 | Rooke | |
| 6,370,289 B1 | 4/2002 | Bennett | |
| 6,583,399 B1 | 6/2003 | Guido et al. | |
| 6,763,153 B2 * | 7/2004 | Bennett ....................... | 385/12 |
| 6,765,678 B2 | 7/2004 | Strandjord et al. | |
| 2002/0092977 A1 | 7/2002 | Lerber Von et al. | |
| 2002/0172457 A1 | 11/2002 | Tapalian et al. | |
| 2003/0081219 A1 * | 5/2003 | Bennett ...................... | 356/460 |
| 2004/0146431 A1 | 7/2004 | Scherer et al. | |
| 2005/0117157 A1 | 6/2005 | Tarsa | |
| 2005/0162656 A1 | 7/2005 | Zhou et al. | |
| 2005/0191008 A1 * | 9/2005 | Anson et al. .................. | 385/39 |

OTHER PUBLICATIONS

Burns, W.K., et al., Excess Noise in Fiber Gyroscope Sources, IEEE Photonics Technology Letters, vol. 2, No. 2, Aug. 1990.

* cited by examiner

*Primary Examiner*—Tarifur Chowdhury
*Assistant Examiner*—Jonathan M Hansen
(74) *Attorney, Agent, or Firm*—Black Lowe & Graham PLLC

(57) ABSTRACT

Methods and apparatus are provided for reducing output noise of optical gyros. The apparatus includes a sensing system for circulating counter-propagating light beams and producing an output light beam, a coupler having multiple ports and supplying an input light beam to the sensing system, a first detector coupled to the coupler for detecting a rotation rate based on the output light beam, a second detector coupled to the coupler for detecting noise based on the input light beam, and at least one optical device coupled to one of the ports of the coupler. The optical device is configured to reduce a spectral mismatch between the input light beam received by the second detector and the output light beam received by the first detector.

6 Claims, 4 Drawing Sheets

SPECTRAL BALANCING SYSTEM AND METHOD FOR REDUCING NOISE IN FIBER OPTIC GYROSCOPES

FIELD OF THE INVENTION

The present invention generally relates to gyroscopes, and more particularly relates to spectral balancing and reducing noise in fiber optic gyroscopes.

BACKGROUND OF THE INVENTION

Gyros have been used to measure rotation rates or changes in angular velocity about an axis of rotation. A basic conventional fiber optic gyro (FOG) includes a light source, a beam splitting device, and a fiber sensing coil coupled to the beam splitting device that encircles an area. The beam splitting device may be an integrated optics chip (IOC) that splits light from the source into beams that counter-propagate through the fiber sensing coil. The two counter-propagating beams experience different pathlengths while propagating around a rotating closed optical path, and the difference in the two pathlengths is proportional to the rotational rate that is normal to the enclosed area.

High-performance FOGs, such as may be used for submarine navigation and space-based pointing applications, typically use a gyro with very low angle random walk (ARW). ARW refers to a noise component (e.g., a drift) of the FOG output. In high-performance FOGs, ARW is predominately affected by a relative intensity noise (RIN) which results from the random intensity fluctuations of the light used for sensing rotation. RIN subtraction may be used with the FOG to reduce RIN. For example, light from the source is split into two paths at a coupler. One path directs light from the source to the IOC where the light is split into two beams, which counter-propagate through the fiber sensing coil, then recombine at the IOC and propagate back to the coupler where a portion of the light is redirected to a rate detector for rate sensing. The other path directs light from the source to a RIN detector. For an ideal gyro, the RIN at the rate and RIN detectors are a common noise that can be subtracted out. In practice, the RIN at the rate and RIN detectors may be partially de-correlated. One source of de-correlation is differential spectral filtering, which can occur because the rate and RIN optical waves propagate along different paths of the optical circuit. A spectral mismatch at the rate and RIN detectors may limit the reduction of RIN from the rate signal.

Accordingly, it is desirable to provide an optical gyro having reduced output noise. In addition, it is desirable to provide a method for determining a rotation rate of an optical gyro that reduces gyro output noise. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and apparatus are provided for reducing spectral mismatch in an optical gyro. In an exemplary embodiment, an optical gyro is provided comprising a sensing system configured to circulate counter-propagating light beams and further configured to produce an output light beam derived from the counter-propagating light beams, a coupler having multiple ports, a first detector coupled to a third port of the coupler and configured to detect a rotation rate of the optical gyro from a portion of the output light beam, a second detector coupled to a fourth port of the coupler and configured to detect a noise in a portion of the input light beam, and an optical device coupled to one of the ports of the coupler. The coupler is configured to receive an input light beam and further configured to supply the input light beam to the sensing system via a second port. The counter-propagating light beams are derived from the input light beam. The coupler is further configured to direct the portion of the output light beam to the first detector. The first coupler is further configured to direct the portion of the input light beam to the second detector. The optical device is configured to reduce a spectral mismatch between the portion of the input light beam and the portion of the output light beam.

In another exemplary embodiment, an optical gyro is provided comprising a sensing system configured to circulate counter-propagating light beams and further configured to produce an output light beam derived from the counter-propagating light beams, a coupler having first, second, third, and fourth ports, a first optical device having an input coupled to the third port of the coupler and having an output, a first detector coupled to the output of the first optical device and configured to detect a rotation rate of the optical gyro from the portion of the output light beam, a second optical device having an input coupled to the fourth port of the coupler and having an output, and a second detector coupled to the output of the second optical device and configured to detect a noise in the portion of said input light beam. The coupler is configured to receive an input light beam via the first port, supply the input light beam to the sensing system via the second port, direct a portion of the output light beam to the first optical device, and direct a portion of the input light beam to the second optical device. The counter-propagating light beams are derived from the input light beam. The first and second optical devices are together configured to reduce a spectral mismatch between the portion of the output light beam and the portion of the input light beam.

In another exemplary embodiment, a method for determining a rotation rate of an optical gyro is provided comprising the steps of propagating beams of a first portion of an input light beam through the sensing coil in counter-propagating directions, producing an output light beam from the propagating beams of the first portion of the input light beam, detecting the rotation rate of the optical gyro from a portion of the output light beam, detecting a noise from a second portion of the input light beam, and reducing a spectral mismatch between the portion of the output light beam and the second portion of the input light beam.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Methods and apparatus are provided for reducing the output noise of an optical gyro. In an exemplary embodiment, an optical gyro is provided that is configured to reduce spectral mismatch that may occur between the optical signal received by a rate detector and the optical signal received by a relative intensity noise (RIN) detector. Light from a light source is divided by a coupler to follow two optical paths. One of these optical paths directs light to a sensing system where the light is divided (e.g., via an integrated optics chip (IOC) or the like) into beams that counter-propagate through a fiber sensing coil and recombine to produce an output light beam (e.g., a signal wave) that returns to the coupler. The signal wave is used to determine the rotation rate of the optical gyro. The other path supplies light (e.g., a reference wave) from the light source via the coupler to the RIN detector. One or more optical devices are included in one or both of the two optical paths to spectrally match the optical signal received by the rate detector and the optical signal received by the RIN detector. The greater the spectral matching of the optical signal received by the rate detector and the optical signal received by the RIN detector, the greater the reduction of noise that may be present in the optical signal received by a rate detector (e.g., using any RIN reduction method including, but not necessarily limited to, RIN subtraction, optical RIN subtraction, RIN servos, and the like).

Figure 1:
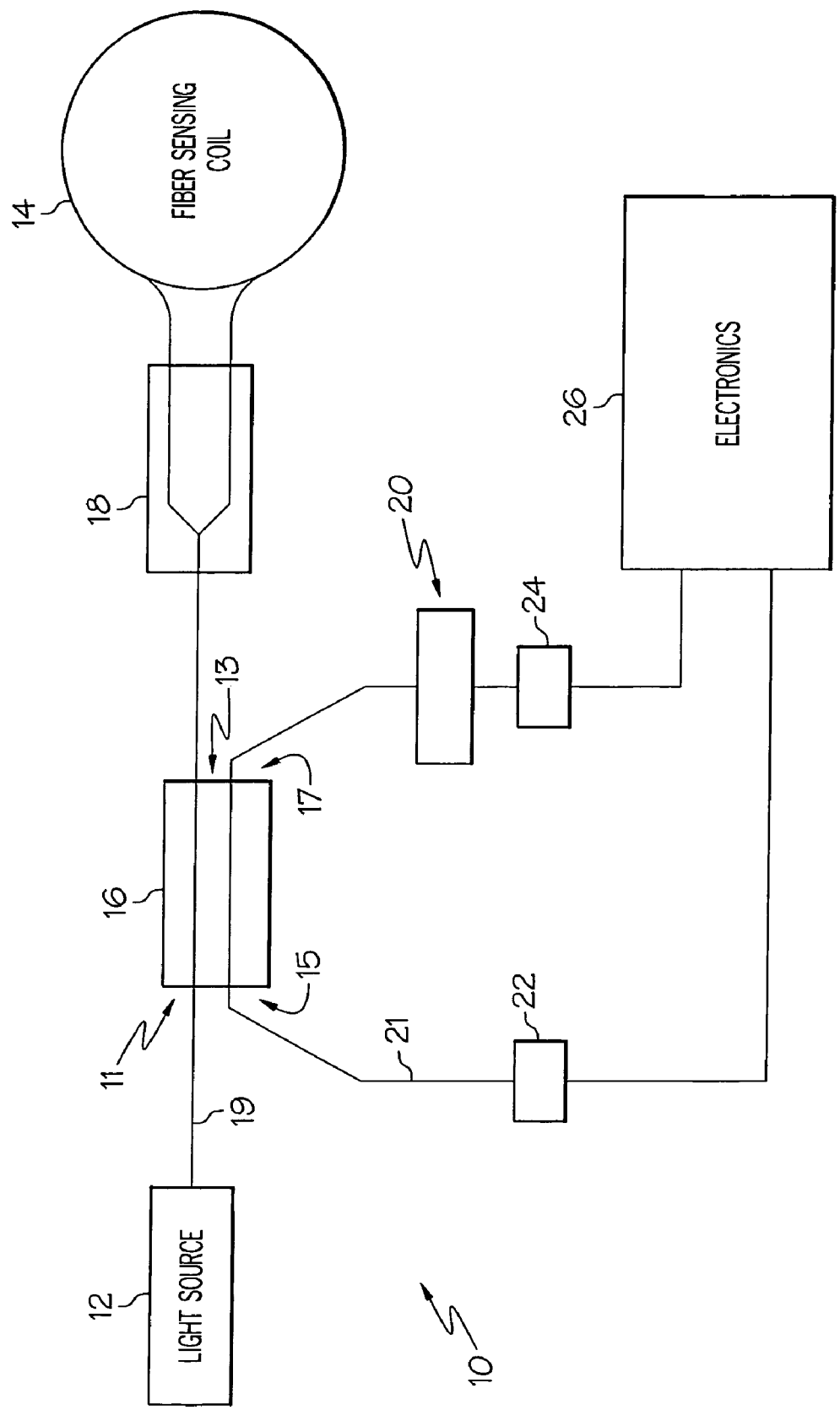
FIG. 1 is a block diagram of a spectrum matching optical gyro in accordance with an exemplary embodiment of the present invention.

Referring now to the drawings, FIG. 1 is a block diagram of a spectrum matching optical gyro 10 in accordance with an exemplary embodiment of the present invention. The optical gyro 10 comprises a light source 12 (e.g., a broadband fiber light source) that synthesizes an input light beam, an optical coupler 16 having a first port 11 coupled to the light source 12, an IOC 18 coupled to a second port 13 of the coupler 16, a fiber sensing coil 14 coupled to the IOC 18, a rate detector 22 coupled to a third port 15 of the coupler 16, a filter 20 having an input coupled to a fourth port 17 of the coupler 16, a RIN detector 24 coupled to an output of the filter 20, and various electronics 26 coupled to the rate detector 22 and RIN detector 24 for processing signals from the detectors 22, 24 (e.g., performing RIN reduction and rotation rate determination). The IOC 18 and fiber sensing coil 14 together form a sensing system. The optical gyro 10 may include additional optical components (not shown), such as mirrors, beam-splitters, or the like, that are found in conventional optical gyros.

Although the optical gyro 10 includes an IOC 18, any other optical routing system may be used that produces the appropriate light beams for circulating through the fiber sensing coil 14 and produces an output light beam representative of the rotation rate of the optical gyro 10 using the fiber sensing coil 14. Light from the light source 12 may propagate along an optical fiber 19 to the coupler 16 and to the IOC 18. Additionally, another optical fiber 21 may be used to couple the rate detector 22 to the coupler 16 and couple the filter 20 to the coupler 16.

Light from the light source is divided by the coupler 16 to follow two optical paths (e.g., a signal path and a reference path). In the signal path, light is directed by the coupler 16 (e.g., from the first port 11 to the second port 13) to the IOC 18. The IOC 18 divides this input light beam into counter-propagating light beams that circulate through the fiber sensing coil 14. In an exemplary embodiment, the counter-propagating light beams are recombined in the IOC 18, forming the output light beam, and return to the coupler 16 (e.g., via the second port 13). A portion of this output light beam is directed to the rate detector 22 for rotation rate sensing. In an exemplary embodiment, the coupler 16 directs a portion of the output light beam from the second port 13 to the third port 15 and to the rate detector 22.

In the reference path, a portion of the light from the light source 12 is directed by the coupler 16 to the filter 20. In an exemplary embodiment, the coupler 16 directs a portion of the light, originating from the light source 12, from the first port 11 to the fourth port 17 and to the filter 20. At this point, the optical beam associated with rotation rate sensing (e.g., the optical beam directed to the rate detector 22) has propagated through more optical components of the optical gyro 10 than the optical beam associated with noise sensing (e.g., the optical beam directed to the RIN detector 24), and the optical beams may be partially de-correlated.

To reduce this de-correlation, the filter 20 spectrally matches the optical spectrum of the light received by the filter 20 (e.g., intended for the RIN detector 24) with the optical spectrum of the light received by the rate detector 22. In an exemplary embodiment, the filter 20 is an optical filter having transmission characteristics that accomplishes this matching. The filter 20 preferably has a transmission spectrum shape that is similar to the shape of the combined transmission spectra of the optical components traversed by the beam associated with rotation rate sensing. Examples of the filter 20 include, but are not necessarily limited to, an optical fiber with a grating formed in the core of the fiber, a micro-optic device having fiber pigtails, one or more micro-optic collimators, a thin film optical filter, or the like.

In another exemplary embodiment, an additional optical device, already used in the optical gyro 10, may be used for spectral matching. This exemplary embodiment is particularly suitable where a single optical component causes most of the spectral mismatch between the optical spectrum of the light received by the filter 20 and the optical spectrum of the light received by the rate detector 22. For example, the filter 20 may be replaced by another coupler (e.g., another optical coupler). Optical couplers may have different spectral transmissions between the waves that couple across ports (e.g., from the first port 11 to the fourth port 17 or from the second port 13 to the third port 15) and the waves that do not cross-couple (e.g., from the first port 11 to the second port 13). As shown in FIG. 1, the waves associated with rotation rate sensing pass through the coupler 16 twice, once without cross-coupling (e.g., from the first port 11 to the second port 13) and once with cross-coupling (e.g., from the second port 13 to the third port 15). The waves associated with noise sensing pass through the coupler 16 once with only cross-coupling (e.g., from the first port 11 to the fourth port 17). The additional coupler is preferably the same type as the coupler 16 and positioned in the reference path before the RIN detector 24 such that the reference beam does not cross-couple. Spectral matching is thus accomplished in this exemplary embodiment because the light beams received by the detectors 22 and 24 each propagate twice through a coupler, once with cross-coupling and once without cross-coupling. The number, type, and position of the filter or other optical device used for spectral matching, may vary based on the optical components along the rotation rate sensing path and the noise sensing path.

Figure 2:
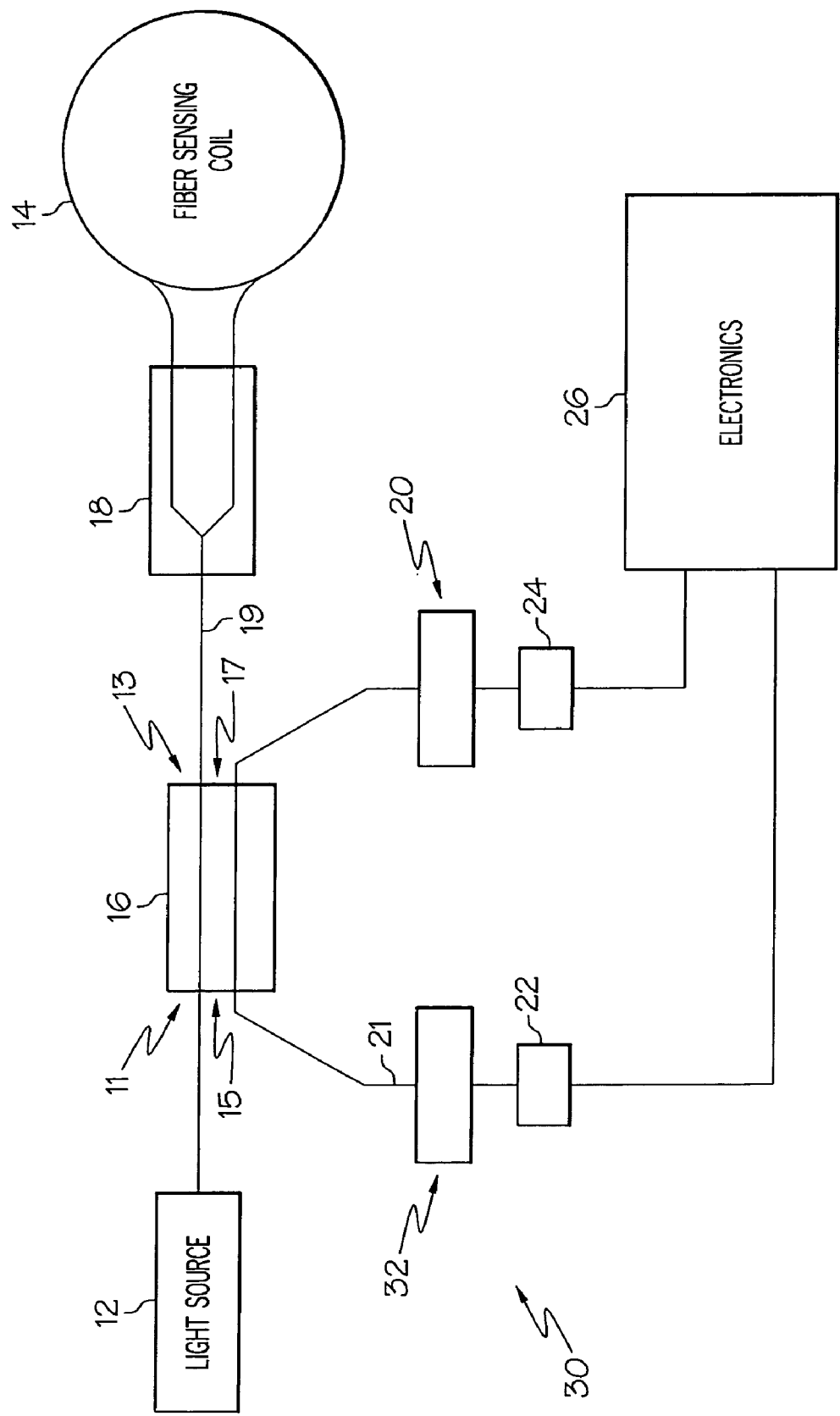
FIG. 2 is a block diagram of a spectrum matching optical gyro in accordance with another exemplary embodiment of the present invention.

FIG. 2 is a block diagram of a spectrum matching optical gyro 30 in accordance with another exemplary embodiment of the present invention. In this exemplary embodiment, the optical gyro 30 is a variation of the optical gyro 10 shown in FIG. 1 and comprises similar components while using two matching filters. In addition to the filter 20, a second filter 32 is inserted in the rotation rate sensing path between the third port 15 of the coupler 16 and the rate detector 22. For example, the filter 32 has an input coupled to the third port 15 of the coupler 16 and an output coupled to the rate detector 22. The filters 20 and 32 are preferably substantially identical, and the transmission spectra of the filters 20 and 32 may be significantly relaxed. In an exemplary embodiment, the filters 20 and 32 each have a transmission spectrum that is narrower than the optical spectrum of the light intended for the RIN detector 24 and the optical spectrum of the light intended for the rate detector 22. Additionally, the spectrum of the light input to each of the filters 20 and 32 preferably completely overlaps the transmission spectrum of the corresponding filter.

Figure 3:
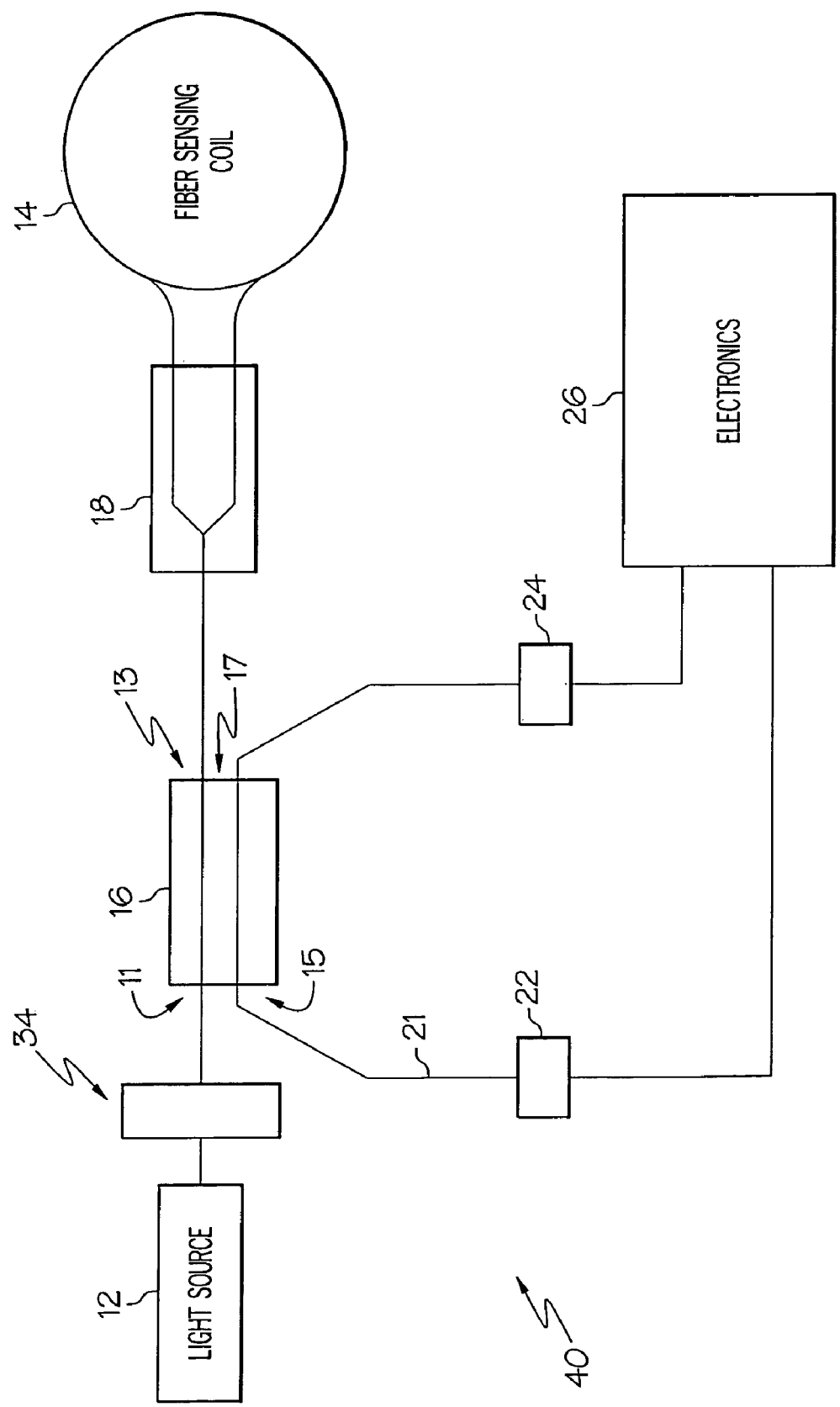
FIG. 3 is a block diagram of a spectrum matching optical gyro in accordance with another exemplary embodiment of the present invention.

FIG. 3 is a block diagram of a spectrum matching optical gyro 40 in accordance with another exemplary embodiment of the present invention. In this exemplary embodiment, the optical gyro 40 is another variation of the optical gyro 10 shown in FIG. 1 and comprises similar components. The filter 20 (shown in FIG. 1) is omitted from the optical gyro 40 and a filter 34 is coupled between the light source 12 and the coupler 16. For example, the filter 34 has an input coupled to the light source 12 and an output coupled to the first port 11 of the coupler 16. The filter 34 is thus positioned before the coupler 16 where both of the beams associated with rotation rate sensing and noise sensing share a common path. The filter 34 preferably has a transmission spectrum that is narrower than the transmission spectrum of the optical components between the filter 34 and the RIN detector 24 and the rate detector 22. Additionally, this transmission spectrum preferably falls within the transmission spectrum of the optical components between the filter 34 and the RIN detector 24 and the rate detector 22.

Figure 4:
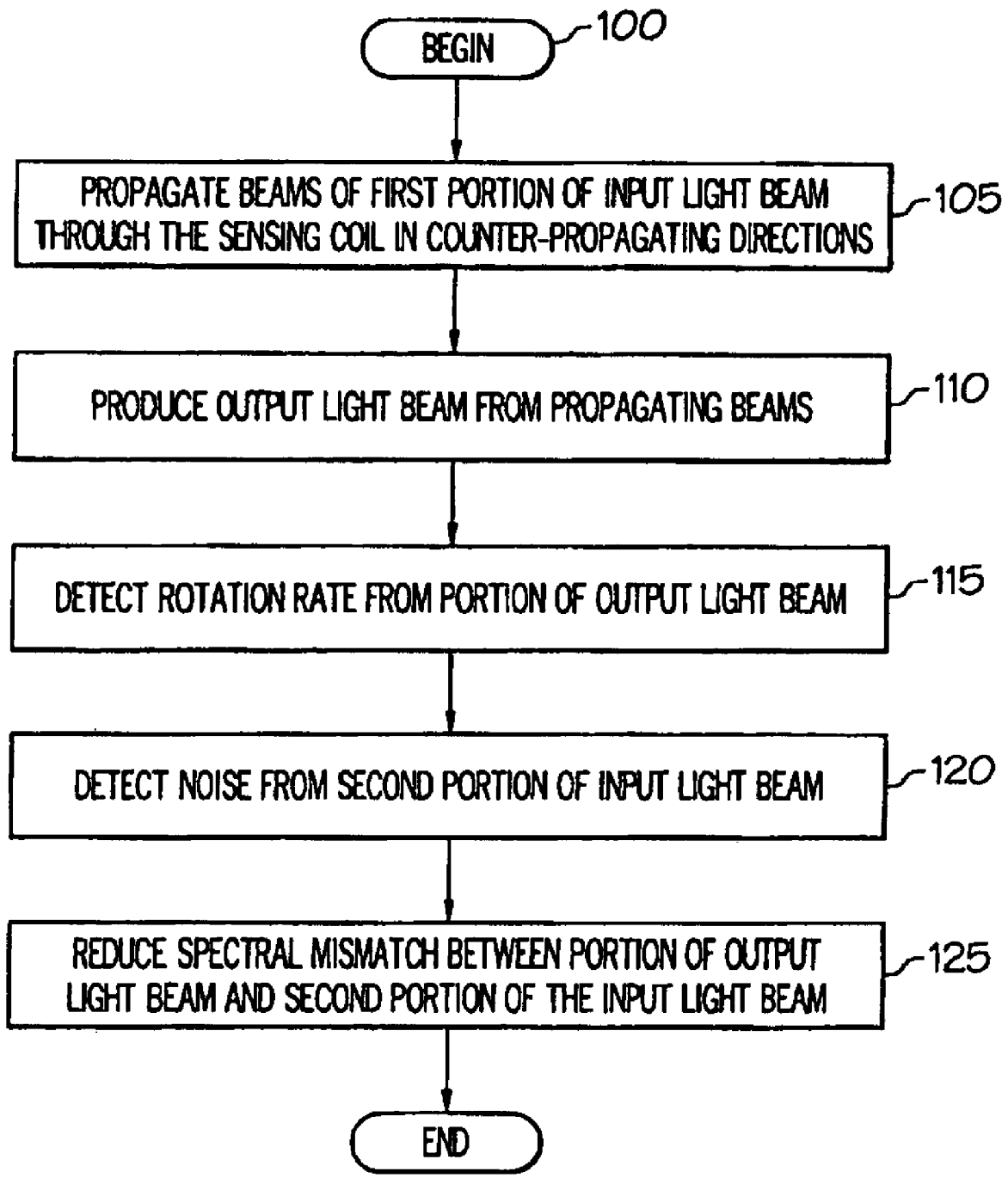
FIG. 4 is a flow diagram of a method for reducing noise in a fiber optic gyroscope in accordance with an exemplary embodiment of the present invention.

Referring to FIGS. 1 and 4, FIG. 4 is a flow diagram of a method 100 for determining a rotation rate in an optical gyro in accordance with an exemplary embodiment of the present invention. Beams of a first portion of an input light beam are propagated through a sensing coil (e.g., the sensing coil 14) in counter-propagating directions, as indicated at step 105. For example, the input light beam from the light source 12 is divided by the coupler 16 to follow two optical paths, and a first portion of the input light beam is directed to the IOC 18. After the first portion of the input light beam is introduced to the IOC 18, the first portion of the input light beam is divided to produce counter-propagating beams that circulate through the sensing coil 14. An output light beam is produced from the propagating beams of the first portion of the input light beam, as indicated at step 110. After circulating through the sensing coil 14, the light beams are recombined at the IOC 18 to form the output light beam. In one exemplary embodiment, the output light beam is cross-coupled to form the portion of the output light beam. For example, the output light beam returns to the coupler 16, and a portion of the output light beam is cross-coupled (e.g., from the fiber 19 to the fiber 21) via the coupler 16 and directed to the rate detector 22. The rotation rate of the optical gyro is detected from a portion of the output light beam, as indicated at step 115. Noise is detected from a second portion of the input light beam, as indicated at step 120. For example, after the input light beam is divided by the coupler 16 to follow two paths, some of the input light beam is cross-coupled (e.g., from fiber 19 to the fiber 21) via the coupler 16 to form the second portion of the input light beam. The second portion of the input light beam is directed to the RIN detector 24. A spectral mismatch between the portion of the output light beam and the second portion of the input light beam is reduced at step 125. The portion of the output light beam, intended for the rate detector 22, has a first optical spectrum and the second portion of the input light beam, intended for the RIN detector 24, has a second optical spectrum. In one exemplary embodiment, the first optical spectrum is matched with the second optical spectrum.

The spectral mismatch may be reduced by filtering the second portion of the input light beam through an optical filter (e.g., the optical filter 20). A second coupler may be substituted for the filter 20 to reduce spectral mismatch such that the second portion of the input light beam passes through the second coupler without cross-coupling.

The spectral mismatch may also be reduced by filtering the input light beam through a filter (e.g., the filter 34 shown in FIG. 3) prior to propagating the light beams through the sensing coil. The filter 34 preferably has a transmission spectrum that is narrower than the transmission spectrum of the optical components between the filter 34 and the RIN detector 24 and rate detector 22. Additionally, this transmission spectrum preferably falls within the transmission spectrum of the optical components between the filter 34 and the RIN detector 24 and rate detector 22.

The spectral mismatch may also be reduced by filtering the portion of the output light beam with a first filter (e.g., the filter 32 shown in FIG. 2) prior to detecting the rotation rate and filtering the second portion of the input light beam with a second filter (e.g., the filter 20) prior to detecting noise. The first and second filters each preferably have a transmission spectrum narrower than the first and second optical spectra, the first optical spectrum overlaps the transmission spectra of the first filter, and the second optical spectrum overlaps the transmission spectrum of the second filter. In one exemplary embodiment, the first and second filters are substantially identical While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical gyro comprising:
a sensing system configured to circulate counter-propagating light beams and further configured to produce an output light beam derived from said counter-propagating light beams;
a coupler having first, second, third, and fourth ports, said coupler configured to receive an input light beam via said first port and further configured to supply said input light beam to said sensing system via said second port, said counter-propagating light beams derived from said input light beam;
a first optical device having an input coupled to said third port of said coupler and having an output, said coupler further configured to direct a portion of said output light beam to said first optical device;

a first detector coupled to said output of said first optical device and configured to detect a rotation rate of the optical gyro from said portion of said output light beam;

a second optical device having an input coupled to said fourth port of said coupler and having an output, said coupler further configured to direct a portion of said input light beam to said second optical device; and a second detector coupled to said output of said second optical device and configured to detect noise in said portion of said input light beam, said first and second optical devices together configured to reduce a spectral mismatch between said portion of said output light beam and said portion of said input light beam.

2. An optical gyro according to claim 1, wherein said portion of said output light beam has a first spectrum; wherein said portion of said input light beam has a second spectrum; and wherein said first and second optical devices are together configured to match said first and second spectrums.

3. An optical gyro according to claim 2, wherein said first and second optical devices each have a transmission spectrum narrower than said first and second spectrums, wherein said first spectrum overlaps said transmission spectrum of said first optical device, and wherein said second spectrum overlaps said transmission spectrum of said second optical device.

4. An optical gyro according to claim 1, wherein said first and second optical devices are substantially identical.

5. A method for determining a rotation rate of an optical gyro having a sensing coil, the method comprising the steps of:

propagating beams of a first portion of an input light beam through the sensing coil in counter-propagating directions;

producing an output light beam from the propagating beams of the first portion of the input light beam;

detecting the rotation rate of the optical gyro from a portion of the output light beam;

detecting noise from a second portion of the input light beam; and reducing a spectral mismatch between the portion of the output light beam and the second portion of the input light beam, wherein said step of reducing a spectral mismatch comprises:

filtering the portion of the output light beam with a first filter prior to said step of detecting the rotation rate; and filtering the second portion of the input light beam with a second filter prior to said step of detecting noise; and wherein the portion of the output light beam has a first optical spectrum and the second portion of the input light beam has a second optical spectrum, the first and second filters each having a transmission spectrum narrower than the first and second optical spectra, the first optical spectrum overlapping the transmission spectrum of the first filter, and the second optical spectrum overlapping the transmission spectrum of the second filter.

6. A method according to claim 5, wherein the first and second filters are substantially identical.

* * * * *